Nov. 11, 1952　　　A. R. MARSHALL　　　2,617,488
MOTOR-DRIVEN SHEEP FOOT TAMPER
Filed April 6, 1950　　　　　　　　　　　　3 Sheets-Sheet 1

Audie R. Marshall
INVENTOR.

BY *Clarence A. O'Brien
and Harvey B. Jacobson*
Attorneys

Nov. 11, 1952   A. R. MARSHALL   2,617,488
MOTOR-DRIVEN SHEEP FOOT TAMPER
Filed April 6, 1950   3 Sheets-Sheet 2
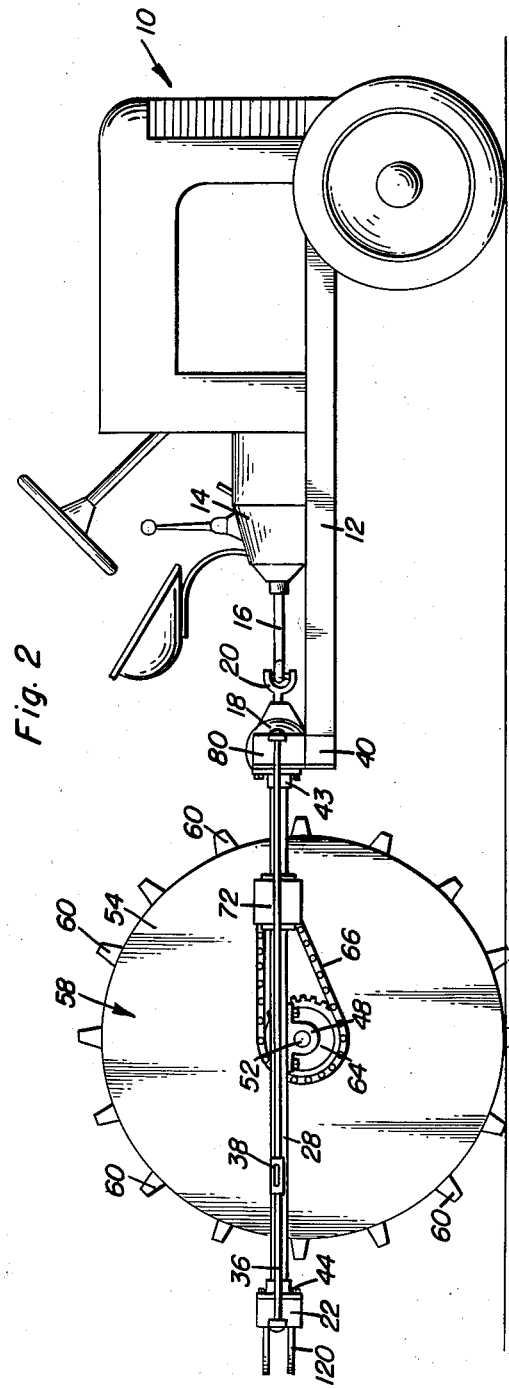
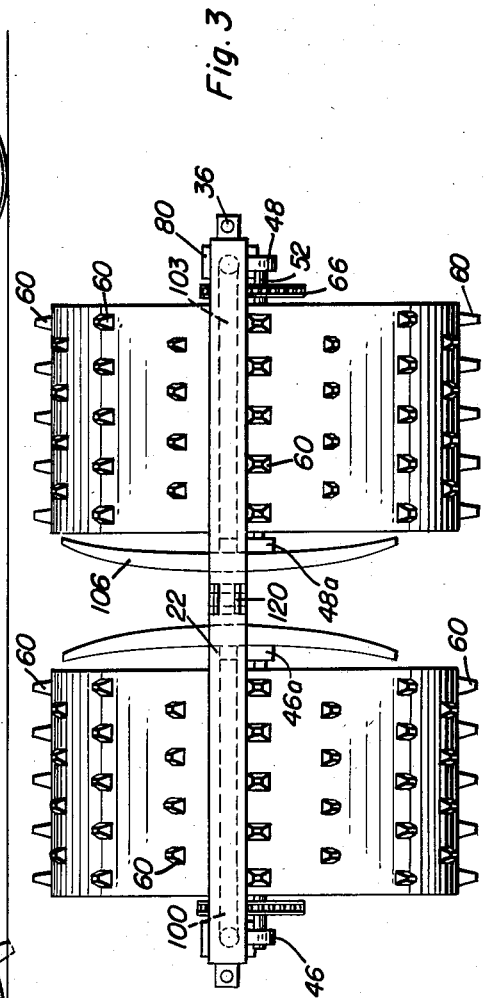
Audie R. Marshall
INVENTOR.

Nov. 11, 1952  A. R. MARSHALL  2,617,488
MOTOR-DRIVEN SHEEP FOOT TAMPER
Filed April 6, 1950  3 Sheets-Sheet 3

Audie R. Marshall
INVENTOR.

Patented Nov. 11, 1952

2,617,488

UNITED STATES PATENT OFFICE 2,617,488

MOTOR-DRIVEN SHEEP FOOT TAMPER

Audie R. Marshall, House, N. Mex., assignor of fifty per cent (50%) to Thomas R. Marshall, Abilene, Tex.

Application April 6, 1950, Serial No. 154,314

5 Claims. (Cl. 180—20)

This invention relates to useful improvements in mechanically operated vehicles of the type which are especially adapted to perform certain particular jobs.

An object of this invention is to provide an improved tamper which is incorporated in a vehicle, as the rear part thereof, and acts as the driving medium for the vehicle.

One of the important features of the present invention is the means of guiding the roller or tamper rollers in their pivotal movement.

Ancillary objects and features of novelty will become apparent in following the description of the illustrated form of the invention.

In the drawings:

Figure 2 is a side view of the device in Figure 1;

Figure 3 is an elevational view of the rollers and their mounting assembly;

Figure 1:
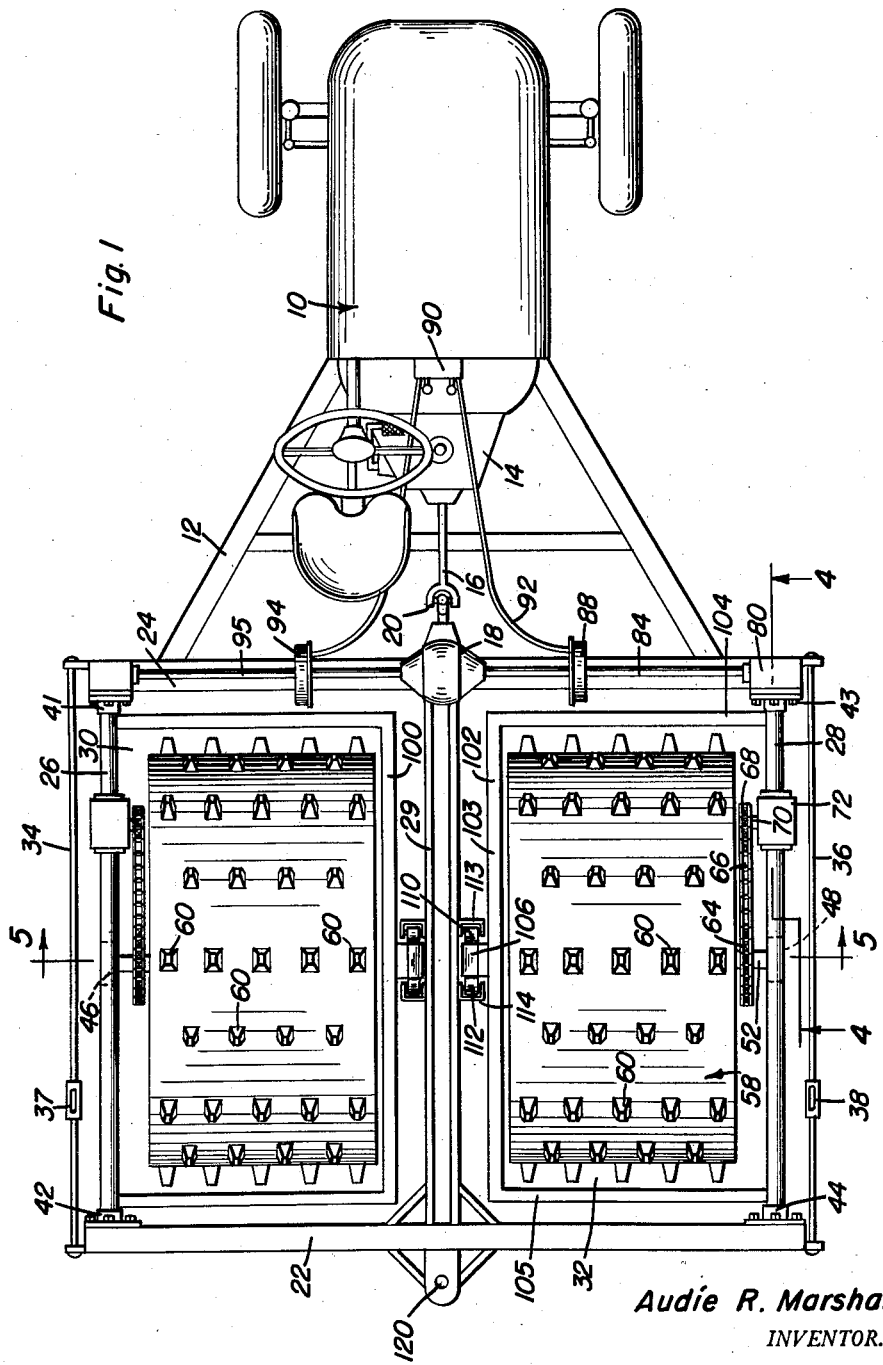
Figure 1 is a plan view of the device.
Figure 4:
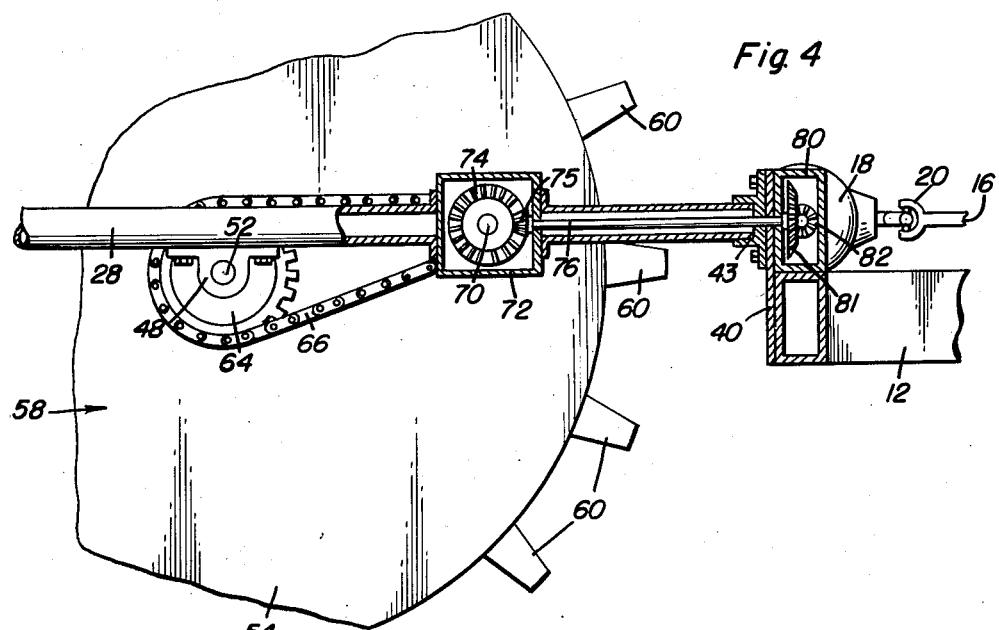
Figure 4 is an enlarged transverse view taken substantially on the line 4—4 of Figure 1 and in the direction of the arrows.
Figure 5:
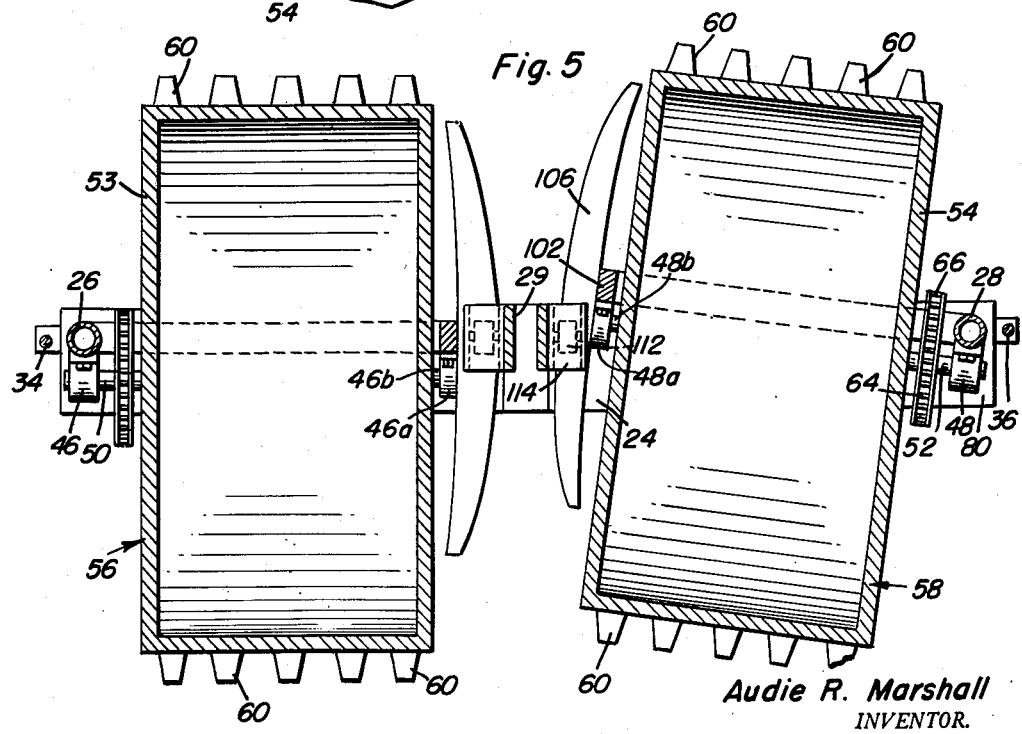
Figure 5 is a sectional view taken substantially on the line 5—5 of Figure 1 and in the direction of the arrows, the rollers being in different positions to illustrate the action of the means of guiding one roller in its pivotal travel.

In carrying out the invention, there is provided a vehicle 10 with the usual mechanical devices pertinent to such vehicles, including a chassis 12, a transmission 14 and drive shaft 16. The drive shaft is coupled with a differential 18 of conventional description by means of the universal joint 20.

A frame consisting of sides 22 and 24 together with tubular ends or end members 26 and 28 is provided with a transverse cross member 29 which divides the frame into chamber 30 and the chamber 32. Stay rods 34 and 36 are secured to the ends of the sides 24 and 22 and turnbuckles 37 and 38 are provided in the stay rods in order to provide rigidity in the frame construction.

The side 24 is secured to the rear end of the chassis 12 through the medium of small vertical standards 40 (Figure 2). The frame, in effect, forms a rear continuation of the chassis 12.

The ends or end members 26 and 28 are rotatably disposed at their ends in bearings 41, 42 and 43, 44. The bearings are secured to the sides 24 and 22, thereby mounting the tubular ends 26 and 28 for rotation about a horizontal axis.

Bearings 46 and 48 depend from the tubular ends 26 and 28 to support the trunnions 50 and 52 which are secured to the end plates 53 and 54 of the rollers 56 and 58. These rollers are provided with tamper members 60 which in themselves perform their usual function. By this construction, the rollers 56 and 58 are mounted for rotation about the trunnions as axes and are also mounted for pivotal movement about the longitudinal axes of the tubes 26 and 28.

To operate the rollers 56 and 58, a symmetrical construction is provided (see Figure 1). A sprocket 64 is fixed to the trunnion 52 and there is a chain 66 entrained therearound. Another sprocket 68 is mounted on the stub shaft 70 which projects from the side of the gear box 72 having the bevel gears 74 and 75 therein. The gear 75 is secured to the shaft 76 which is concentrically mounted in the tube 28 and which terminates in the gear box 80. The meshed gears 81 and 82 in the gear box 80 transmit power from the shaft 84 which extends from the differential 18. An air or liquid operated brake 88 of conventional description is disposed on the shaft 84 in order to provide braking action therefor. A control box 90 with a line 92 leading therefrom is provided on the tractor 10 in order to operate the brake 88. An identical brake 94 is provided on the shaft 95, said shaft 95 being similar in structure and function to the shaft 84, the only difference being that it provides a part of the assembly for drivingly operating the roller 56 instead of the roller 58.

Accordingly, in operation, the tractor engine causes torque to be transmitted to the shafts 95 and 84, the operative one being controlled by utility of either of the brake 88 or the brake 94. This in turn operates the pertinent roller.

When, for one reason or another, one of the rollers is to be lifted, as by running over a tree stump or the like, the sub-frame 100 or 102 is also lifted. Each sub-frame, for example the sub-frame 102, is substantially U-shaped including a web 103 having legs 104 and 105 extending therefrom. The ends of the legs are secured to the side 28 so that they may move therewith as the side rotates about its horizontal axis. The webs 103 of the sub frames 100 and 102 support bearings 46a and 48a that receive trunnions 46b and 48b projecting outwardly from the inner end walls of the rollers 56 and 58 and coaxial with the trunnions 50 and 52, respectively.

Means for guiding the sub-frame, and hence the roller 58 in its travel is provided. The preferable means consists of an arm 106 having a smoothy curved outer surface which is disposed between a pair of rollers 110 and 112 which are carried by the brackets 113 and 114. Said brackets are secured to the cross member 29 and the brackets and rollers form a guide restricting the pivotal movement of the sub-frame and roller assembly.

One or more of the illustrated units may be used in series by employment of the drawbar 120 and the usual coupling pin. The second and all subsequent units will be operated by remote control from the operator's position on the front unit by removing front wheels from each trailer unit.

Having described the invention, what is claimed as new is:

1. In a vehicle which includes a chassis, a frame having ends and sides, one of said sides being secured to the chassis, said ends being rotatively connected to said sides, sub-frames connected with said ends, rollers located within said sub-frames, means mounting said rollers on said ends of said frame for rotation, means forming guideways connected to a part of said frame, and guides connected with said sub-frames and located in said guideways to limit the movement of said sub-frames.

2. The combination of claim 1, and said guides comprising arms with longitudinally curved surfaces and side surfaces, and said guideways including rollers which contact the side surfaces of said longitudinally curved arms.

3. The combination of claim 1, and said guideways having rollers, and said guides including arms against which said rollers contact.

4. In a vehicle which includes a chassis, a rectangular frame having ends and sides, a cross member extending between said sides and defining a pair of chambers, a tamper roller disposed in each of said chambers, said ends being mounted for rotation in said sides, a bearing secured to each of said ends, each roller having a trunnion, the trunnion of one roller being received in the bearing of one of said ends and the trunnion of the other roller being received in the bearing of the other of said ends, whereby said rollers are mounted for pivotal movement about said ends as axes, means connected with said rollers for actuating the rollers, guide members secured to said cross member, and arms associated with said rollers and disposed in said guide members to guide said rollers in their pivotal movement.

5. In a vehicle which includes a chassis, a frame secured to the rear end of said chassis, a roller disposed in said frame, and means floatingly securing said roller to said frame, said means including a sub-frame with a part thereof constituting a rotary shaft carried by said frame, a trunnion extending from said roller, a bearing secured to said sub-frame shaft and receiving the trunnion, a second trunnion extending from the roller and disposed coaxial with the first named trunnion and on the opposite side of the roller from the first named trunnion, a second bearing carried by the sub-frame receiving the second trunnion, and a guide operatively connected with said sub-frame and a part of said frame to limit the movement of said sub-frame about the first named trunnion.

AUDIE R. MARSHALL.

REFERENCES CITED

The following references are of record in the file of this patent:

UNITED STATES PATENTS

| Number | Name | Date |
|---|---|---|
| 1,057,472 | Wiley | Apr. 1, 1913 |
| 1,196,285 | Rasmussen | Aug. 29, 1916 |
| 2,295,645 | Flynn | Sept. 15, 1942 |
| 2,510,817 | Greiner et al. | June 6, 1950 |